Sept. 7, 1948.                J. G. SOLA                 2,448,925
MOTOR SYSTEM USING VOLTAGE REGULATING TRANSFORMER
Filed March 21, 1946

Inventor
Joseph G. Sola

Patented Sept. 7, 1948

2,448,925

UNITED STATES PATENT OFFICE 2,448,925

MOTOR SYSTEM USING VOLTAGE REGULATING TRANSFORMER

Joseph G. Sola, River Forest, Ill., assignor, by mesne assignments, to Chicago Title and Trust Company, Chicago, Ill., a corporation of Illinois, trustee Application March 21, 1946, Serial No. 655,963

8 Claims. (Cl. 318—389)

This invention relates to motor control systems, more particularly to systems for providing constant-voltage energization of motors from sources of alternating current characterized by fluctuating voltage, and the invention has for an object the provision of simple, reliable and inexpensive systems of this character.

In the operation of various types of motor-driven equipment, particularly equipment driven by single phase fractional horsepower motors, various difficulties, as for example stalling of the motor and failure to restart under load, may result from large fluctuations or dips in the supply voltage such as may be encountered in rural areas supplied from local or private power stations. In an attempt to overcome the results of such voltage fluctuations it has been proposed to energize the driving motors of such equipment from so-called constant-voltage transformers capable of maintaining a substantially constant secondary voltage over a wide range of fluctuations of the primary voltage.

One type of constant-voltage transformer particularly suited for use in such applications, because of its reliability and simplicity of construction, is described and broadly claimed in my prior Patent No. 2,143,745, issued January 10, 1939, and entitled Constant voltage transformer.

As more fully set forth in my prior patent, constant-voltage transformers embodying the principles of the invention described and claimed therein are characterized by high reluctance magnetic shunts disposed between the primary winding and the constant-voltage or load winding, which latter winding forms a part of an oscillatory or resonant circuit for maintaining the constant voltage output. An inherent characteristic of such transformers resides in their inability to establish and maintain the oscillatory or resonant condition of operation when subjected to abnormal overloads in the neighborhood of short circuit. Consequently, if the motor to be controlled is energized from a constant-voltage transformer of this type having just sufficient capacity or rating to energize the particular motor during running operation at full load with the usual allowance for normal overload conditions, the transformer will be incapable of supplying the high inrush starting current required by the motor when started under load.

With the above characteristics of the equipment in mind, it has been proposed to utilize a conventional auto-transformer for starting purposes and to switch over to a constant-voltage transformer after the motor has attained its normal running speed. Prior attempts to accomplish the switchover have involved the use of conventional definite time relays and the like, but have not proven successful due to the tendency of the motor to stall or decrease in speed during the switchover, whereupon the constant-voltage transformer may fail to pick up the load. Furthermore, definite time relays of this type are not entirely reliable and the motor may fail to come up to speed during the time interval provided by the relay. Accordingly, it is a further object of this invention to provide an improved motor control system of the above-indicated character in which the switchover from the starting transformer to the constant-voltage transformer is accomplished automatically in accordance with the operating conditions of the motor itself and the transformer windings.

In carrying out the invention in one form, I provide a constant-voltage transformer and a motor of the type hereinbefore indicated together with conductor means for connecting the motor in a primary or starting circuit, which circuit includes the primary winding of the transformer and a pair of contacts operable to open and close the circuit. Further conductor means are arranged to connect the motor in a permanently closed secondary circuit including the constant-voltage winding of the transformer, and means are provided automatically responsive to the electrical characteristics of the energizing circuits during starting and running of the motor for closing the contacts to effect starting and acceleration of the motor from the primary energizing circuit and for opening the contacts after the motor has attained a predetermined speed, thereby to energize the motor solely from the secondary energizing circuit during normal running operation. More particularly, the conductor means providing the primary and secondary energizing circuits connect the constant-voltage winding in auto-transformer relation to the primary winding in bucking relation thereto, and the means for automatically closing the contacts to establish the primary energizing circuit comprises a voltage-responsive means energizable in accordance with the sum of the voltages across the primary and constant-voltage windings. In addition to the voltage-responsive means, the means for operating the contacts includes means responsive to the current in the primary energizing circuit for maintaining the contacts closed until the motor has attained its normal running speed, the voltage- and current-responsive means being ineffective to maintain the contacts closed so long as the motor is operating at such a speed.

For a more complete understanding of the invention, reference should now be had to the drawings in which.

Figure 1:
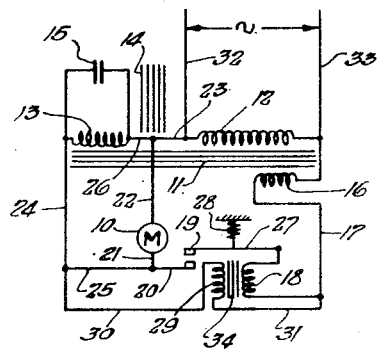
Fig. 1 is a diagrammatic representation of a motor control system embodying the invention.

Referring now to Fig. 1 of the drawings, I have shown the invention as embodied in a control system for a motor 10 which may be of any suitable type, such for example as a single phase fractional horsepower motor employing split-phase starting. Inasmuch as motors of this general type are well known in the art, the starting and running connections internal to the motor, together with the control relays therefor, have not been illustrated. The energizing transformer diagrammatically illustrated in Fig. 1 is a constant-voltage transformer of the type disclosed in my above referred to prior patent and, as more fully explained therein, comprises a magnetic core 11 on which are wound suitable primary and secondary windings 12 and 13, the core structure of the transformer including a high reluctance shunt 14 magnetically disposed between the windings 12 and 13, and the secondary or constant-voltage winding 13 having a condenser 15 connected in circuit therewith for establishing an oscillating or resonant condition which operates to maintain substantially constant the voltage across the winding 13 regardless of fluctuations in the voltage impressed on the primary winding 12.

In accordance with the present invention the transformer is provided with an auxiliary winding 16 connected in auto-transformer relation with the primary winding 12, the primary and auxiliary windings being connected in a primary energizing circuit for starting the motor 10, which circuit may be traced from one terminal of the auxiliary winding 16, through a conductor 17, a relay coil 18, a pair of relay contacts 19, conductors 20 and 21, the motor 10, and by way of conductors 22 and 23 to the opposite terminal of the primary winding 12. Likewise, the motor 10 is connected in a secondary energizing circuit including the constant-voltage winding 13, which circuit is permanently closed and may be traced from the left-hand terminal of the winding 13, through the conductors 24, 25 and 21, the motor 10, and by way of conductors 22 and 26 to the opposite terminal of the winding 13.

The contacts 19 and the relay coil 18 form parts of a simple control relay including a pivoted armature 27 which carries one of the contacts and is normally biased by a spring 28 to the open circuit position shown in Fig. 1. In addition to the current coil 18 the control relay includes a voltage coil 29 which is connected across all of the windings of the transformer through conductors 30 and 31 so as to be responsive to the sum of the voltages. It will be observed that the constant-voltage winding 13 is connected in auto-transformer relation with the primary winding 12 through the conductors 23 and 26, and in accordance with the present invention the windings 13 and 16 are arranged in bucking relation to each other.

In describing the operation of the control system shown in Fig. 1, it will be assumed that with the motor 10 at a standstill and the contacts 19 in the open circuit position, the primary winding 12 is energized from a suitable source of alternating current through the conductors 32 and 33 by means of a suitable starting switch (not shown). Upon energization of the primary winding 12 the voltage coil 29 of the control relay is subjected to a voltage equal to the sum of the voltages across the windings 12, 13 and 16.

With the motor at a standstill the constant-voltage winding 13 is substantially short circuited through the motor and, by reason of the high leakage reactance provided by the magnetic shunt 14 interposed between the windings 12 and 13, only a small voltage is induced in the winding 13. Preferably, the winding 16 is so proportioned as to supply a voltage approximately equal or slightly greater than the voltage induced in the winding 13 under these conditions, and accordingly the voltage coil 29 is energized at substantially the full line voltage applied to the primary winding 12, whereupon the magnetic force produced by energization of the coil 29 is effective to close the contacts 19 and connect the motor 10 directly across the auto-transformer provided by the windings 12 and 16 to effect starting of the motor.

Closure of the contacts 19 substantially short circuits the voltage coil 29 as will be apparent from Fig. 1, but the current coil 18 is now effective to maintain the contacts 19 closed due to the heavy starting current flowing in the primary energizing circuit. As the motor comes up to speed, the current flowing in the primary energizing circuit and the current coil 18 gradually decreases as the back-E. M. F. of the motor increases and at the same time the voltage induced in the secondary winding 13 builds up in corresponding proportion.

By the time the motor has attained its normal running speed the desired oscillatory or resonant condition of operation has been established in the constant-voltage winding 13, and consequently when the contacts 19 open to interrupt the primary energizing circuit the constant-voltage winding 13 will pick up the motor load and the motor will thereafter be energized solely from the secondary energizing circuit.

Since, as previously indicated, the voltage across the winding 13 has now built up to its normal value and since this winding is in bucking relation to the auto-transformer composed of the primary winding 12 and the auxiliary winding 16, the sum of the two voltages, i. e., the differential therebetween, is insufficient to cause reclosure of the contacts 19 by the voltage coil 29. Accordingly, the contacts 19 will remain open and the motor will continue to operate under the energization supplied by the constant-voltage winding 13 until such time as the motor is stopped by deenergization of the primary winding 12. The above described cycle of operations will automatically occur whenever the energizing circuit for the primary winding 12 is closed.

Figure 3:
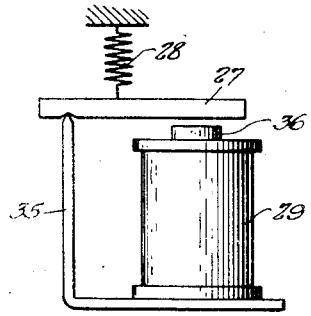
Fig. 3 is a somewhat diagammatic side elevational view of one form of relay means employed in the control systems illustrated in Figs. 1 and 2.
Figure 4:
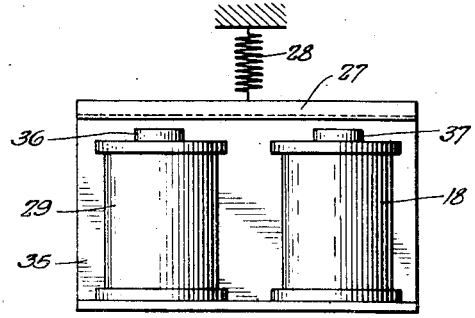
Fig. 4 is a similar front elevational view of the relay shown in Fig. 3.

Although the control relay is illustrated diagrammatically in Fig. 1 as comprising a single magnetic core 34 for the voltage coil 29 and the current coil 18, it has been found preferable to employ a relay having a single armature associated with separate magnetic cores for the two coils in order to reduce to a minimum any inductive or transformer action between the two coils. In Figs. 3 and 4 a suitable relay is diagrammatically shown as comprising a magnetizable base portion 35 on which are supported two cores 36 and 37 for respectively receiving the voltage coil 29 and current coil 18, the single pivoted armature 27 being arranged for operation upon energization of either of the coils.

Figure 2:
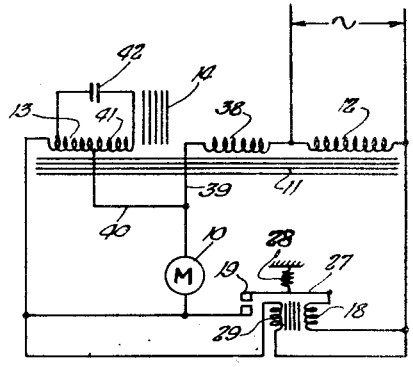
Fig. 2 is a similar diagrammatic representation of a motor control system employing somewhat different circuit connections and likewise embodying the invention.

In the control system shown in Fig. 2 a somewhat different arrangement of the transformer windings is employed, but the system operates in the same manner as the system of Fig. 1, and similar reference numerals have been applied to corresponding elements. In the system of Fig. 2 the transformer is provided with an auxiliary winding 38 which corresponds to the auxiliary winding 16 of Fig. 1 and is connected in autotransformer relation to the primary winding 12, the opposite terminal of the auxiliary winding 38 being connected through conductors 39 and 40 to the midpoint of a winding 41, the left-hand portion of which corresponds to the constant-voltage winding 13 of Fig. 1, and a suitable condenser 42 is connected across the winding 41. By virtue of this arrangement, as will be apparent from a consideration of my above referred to prior patent, a higher voltage and consequently smaller condenser may be employed for producing the desired oscillatory condition in the constant-voltage portion of the transformer. It is thought that the operation of the system shown in Fig. 2 will be apparent from the description heretofore given with respect to the operation of the system of Fig. 1, and it will be understood that in the system of Fig. 2 the auxiliary winding 38 and the constant-voltage winding 13 are connected in bucking relation to each other.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a motor control system for energizing a motor from a transformer incapable of supplying the inrush starting current required by said motor but capable under normal loading of providing substantially constant secondary voltage over a wide range of variations in the primary voltage, the combination of means providing a primary energizing circuit for said motor including the primary winding of said transformer and a pair of contacts operable to open and close said circuit, means permanently connecting said motor to the secondary winding of said transformer to provide a secondary energizing circuit, means responsive to the sum of the voltages across said primary and secondary circuits when said motor is at a standstill for closing said contacts to effect starting and acceleration of said motor from said primary circuit, and means responsive to the current in said primary circuit for maintaining said contacts closed until said motor attains a predetermined speed, said voltage and current-responsive means being ineffective to maintain said contacts closed when said motor attains said speed, whereby upon opening of said contacts said motor is energized solely from said secondary energizing circuit.

2. In a motor control system for energizing a motor from a transformer incapable of supplying the inrush starting current required by said motor but capable under normal loading of providing substantially constant secondary voltage over a wide range of variations in the primary voltage, the combination of an auxiliary winding connected in auto-transformer relation to the primary winding of said transformer, means providing a primary energizing circuit for said motor including said primary and auxiliary windings and a pair of contacts operable to open and close said circuit, means permanently connecting said motor to the secondary winding of said transformer to provide a secondary energizing circuit, said primary and secondary circuits providing an electric connection between said secondary winding and said primary and auxiliary windings with said secondary winding in bucking relation to said auxiliary winding, means responsive to the sum of the voltages across all of said windings when said motor is at a standstill for closing said contacts to effect starting and acceleration of said motor from said primary circuit, and means responsive to the current in said primary circuit for maintaining said contacts closed until said motor attains a predetermined speed, said voltage- and current-responsive means being ineffective to maintain said contacts closed when said motor attains said speed, whereby upon opening of said contacts said motor is energized solely from said secondary energizing circuit.

3. A motor control system comprising the combination with a transformer of the type having a primary and a secondary winding with a high reluctance shunt magnetically disposed therebetween and condenser means connected across said secondary winding for providing substantially constant secondary voltage under normal loading of said secondary over a wide range of variations in the primary voltage, of means connecting said secondary winding electrically to said primary winding in bucking relation thereto, a motor permanently connected across said secondary winding, and means automatically responsive to energization of said primary winding and to the operating condition of said motor for connecting said motor across said primary winding during starting of said motor and for disconnecting said motor from said primary winding for energization solely from said secondary winding when said motor attains a predetermined speed.

4. A motor control system comprising the combination with a transformer of the type having a primary winding and a secondary winding with a high reluctance shunt magnetically disposed therebetween and condenser means connected across said secondary winding for establishing an oscillatory condition therein to maintain the secondary voltage substantially constant under normal loading regardless of fluctuations in the primary voltage, of means connecting said secondary winding electrically to said primary winding in bucking relation thereto, a motor permanently connected across said secondary winding, and means automatically responsive to energization of said primary winding and to the operating condition of said motor and said secondary winding for initially connecting said motor across said primary winding for energization during starting of said motor and for disconnecting said motor from said primary winding for energization solely from said secondary winding at said substantially constant voltage when said motor attains a predetermined speed.

5. A motor control system comprising the combination with a transformer of the type having primary and secondary windings with a high reluctance shunt magnetically disposed therebetween and resonant circuit means including a condenser and said secondary winding for maintaining the secondary voltage substantially constant under normal loading over a wide range of fluctuation of the primary voltage, of means electrically connecting said secondary winding to said primary winding in bucking relation thereto, a motor permanently connected to said secondary winding for energization therefrom and having an inrush starting current greater than said secondary winding can supply while maintaining its resonant operating condition, and means automatically responsive to energization of said primary winding and to the operating conditions of said motor and secondary winding for initially connecting said motor to said primary winding for energization therefrom during starting and acceleration of said motor and for disconnecting said motor from said primary winding for energization solely from said secondary winding at said substantially constant voltage when said motor attains a predetermined speed.

6. In a motor control system including a transformer of the type having primary and secondary windings with a high reluctance shunt disposed magnetically therebetween and condenser means connected across said secondary winding for providing substantially constant secondary voltage under normal loading of said secondary winding over a wide range of variations of the primary voltage, of an auxiliary winding connected in auto-transformer relation to said primary winding in bucking relation to said secondary winding, a motor permanently connected across said secondary winding, and means automatically responsive to energization of said primary winding and to the operating condition of said motor for connecting said motor across the auto-transformer section formed by said primary and auxiliary windings to start and accelerate said motor and for disconnecting said motor from said auto-transformer section for energization solely from said secondary winding when said motor attains a predetermined speed.

7. A motor control system comprising the combination with a transformer of the type having primary and secondary windings with a high reluctance shunt magnetically disposed therebetween and resonant circuit means including a condenser and said secondary winding for maintaining the secondary voltage substantially constant under normal loading over a wide range of fluctuation of the primary voltage, an auxiliary winding connected to said primary winding to form an auto-transformer section disposed on one side of said magnetic shunt, means providing a primary energizing circuit for said motor including said auto-transformer section and a pair of contacts operable to open and close said circuit, means permanently connecting said motor to said secondary winding to provide a secondary energizing circuit, said energizing circuits connecting said secondary winding to said auto-transformer section in bucking relation, means responsive to the sum of the voltages across all of said windings when said motor is at a standstill for closing said contacts to effect starting and acceleration of said motor from said primary circuit, and means responsive to the current in said primary circuit for maintaining said contacts closed until said motor attains a predetermined speed, said voltage- and current-responsive means being ineffective to maintain said contacts closed when said motor attains said speed, whereby upon opening of said contacts said motor is energized solely from said secondary energizing circuit.

8. A motor control system comprising a transformer having a primary winding energizable from a source of alternating current of fluctuating voltage and a pair of secondary windings connected in auto-transformer relation therewith, said secondary windings being in opposing relation to each other, magnetic means providing a high reluctance shunt disposed magnetically between said primary winding and one of said secondary windings, condenser means connected across said one secondary winding for providing substantially constant voltage output therefrom under normal loading of said one secondary regardless of fluctuations in the primary voltage, a motor permanently connected across said one secondary winding for energization therefrom, relay means including normally open contacts operable to closed position to connect said motor across said primary winding and the other of said secondary windings for energization therefrom, said relay means including a voltage winding connected across all of said windings for closing said contacts upon initial energization of said transformer, and including a current winding connected in series with said contacts and said motor for maintaining said contacts closed until the current supplied to said motor through said contacts decreases to a predetermined value, the voltage across said one secondary winding increasing from a low voltage to said substantially constant voltage as said motor speed increases from standstill whereby upon opening of said contacts at a predetermined motor current, the voltage applied to said voltage coil is insufficient to effect reclosure of said contacts, and said motor is thereafter energized at said substantially constant voltage of said one secondary winding.

JOSEPH G. SOLA.

REFERENCES CITED

The following references are of record in the file of this patent:

UNITED STATES PATENTS

| Number | Name | Date |
|---|---|---|
| 2,143,745 | Joseph G. Sola | Jan. 10, 1939 |